(12) United States Patent
Xu et al.

(10) Patent No.: US 11,807,917 B2
(45) Date of Patent: Nov. 7, 2023

(54) ALUMINUM-SCANDIUM WIRE FOR ADDITIVE PROCESSING OPERATION

(71) Applicant: II-VI Delaware, Inc., Wilmington, DE (US)

(72) Inventors: Wen-Qing Xu, Sarver, PA (US);
Shailesh Patkar, Irwin, PA (US);
Xiaoming Li, Allison Park, PA (US);
Di Lan, Edison, NJ (US); Stephen P. Rummel, Sarver, PA (US)

(73) Assignee: II-VI DELAWARE, INC, Wilmington, DE (US)

( * ) Notice: Subject to any disclaimer, the term of this patent is extended or adjusted under 35 U.S.C. 154(b) by 255 days.

(21) Appl. No.: 17/078,646

(22) Filed: Oct. 23, 2020

(65) Prior Publication Data

US 2021/0123120 A1    Apr. 29, 2021

Related U.S. Application Data

(60) Provisional application No. 62/924,851, filed on Oct. 23, 2019.

(51) Int. Cl.
| | | |
|---|---|---|
| *C22C 21/00* | (2006.01) | |
| *B22F 10/22* | (2021.01) | |
| *B33Y 70/00* | (2020.01) | |
| *B33Y 10/00* | (2015.01) | |
| *B33Y 99/00* | (2015.01) | |

(52) U.S. Cl.
CPC ............... *C22C 21/00* (2013.01); *B22F 10/22* (2021.01); *B33Y 10/00* (2014.12); *B33Y 70/00* (2014.12); *B33Y 99/00* (2014.12); *B22F 2301/052* (2013.01)

(58) Field of Classification Search
CPC ............ C22C 21/06; C22C 21/00; C22F 1/04
See application file for complete search history.

(56) References Cited

U.S. PATENT DOCUMENTS

2014/0230974 A1 *   8/2014   Lin ..................... C22C 21/10
                                                              148/695

FOREIGN PATENT DOCUMENTS

WO    WO-2015133004 A1 *   9/2015   ............. C22C 21/00

OTHER PUBLICATIONS

English abstract of Mitose et al. (WO 2015/133004) (Sep. 11, 2015).*

* cited by examiner

*Primary Examiner* — Jessee R Roe
(74) *Attorney, Agent, or Firm* — Blank Rome LLP (57) ABSTRACT

An aluminum alloy wire, more specifically an aluminum-scandium wire, is adapted for an additive processing operation. A spool of material, containing an aluminum alloy wire, and a method of performing an additive processing operation, using an aluminum alloy wire, are also disclosed.

12 Claims, 11 Drawing Sheets

ALUMINUM-SCANDIUM WIRE FOR ADDITIVE PROCESSING OPERATION

This application claims priority to U.S. Provisional Patent Application No. 62/924,851, filed Oct. 23, 2019. The entire disclosure of U.S. Provisional Patent Application No. 62/924,851 is expressly incorporated herein by reference.

BACKGROUND

The present disclosure is directed to an aluminum alloy wire adapted for additive processing operations, and more specifically to an Al—Sc wire adapted for additive processing operations.

Aluminum is widely used in many applications, including the production of consumer, industrial, automobile, aerospace, and military items, because it is chemically stable in a variety of environments, has an extremely low density (2.7 g/cm$^3$), has highly balanced mechanical properties, and is suitable for use across a relatively wide range of operation temperatures.

Aluminum finds many unique uses in transportation industries, such as aerospace, ground transportation, underground transportation, and the military, because of its intrinsically low density. In these applications, aluminum is usually alloyed with another metal, for example, silicon, lithium, magnesium, zirconium, and/or manganese, which improve certain properties of aluminum. However, aluminum, even when alloyed with another metal, may not be able to achieve the appropriate combination of physical properties, such as tensile strength, flexural strength, elongation, etc., for some of these applications.

In these industries, aluminum alloys are used in additive processing operations, such as 3D printing (additive manufacturing), welding, and cladding, in which aluminum alloy wire is used as a raw material. Therefore, there exists a need for an aluminum alloy wire having characteristics that provide the desired properties in the aluminum alloy that is deposited in these operations, provide deposited metal that is free from defects, and allow the operations to be conducted in an efficient manner.

DETAILED DESCRIPTION

As used herein, unless otherwise expressly specified, all numbers such as those expressing values, ranges, amounts or percentages may be read as if prefaced by the word "about," even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present disclosure. "Including," "such as," "for example," and like terms mean "including/such as/for example but not limited to."

The present disclosure is directed to an aluminum alloy wire 500 (FIG. 1), and more specifically an aluminum-scandium wire, adapted for use in additive processing operations, for example, within an additive processing apparatus 502. As used herein, additive processing operations are operations where metal is deposited on a surface 504 (or between two or more surfaces). The deposited metal may be: (1) built in layers to form a three-dimensional (3D) object, for example, by 3D printing; (2) deposited between two workpieces to join the workpieces, for example, by welding; or (3) deposited in a layer on a workpiece, for example, by cladding. In such operations, the wire 500 may be melted by a suitable heat source 506 in order to deposit the metal. The heat source 506 for melting the wire 500 may perform any suitable localized heating process including laser, plasma, arc, and e-beam heating. In such operations, the deposited metal should be free of defects, such as pores, foreign particles, oxides, and the like, and should have low stress. The deposited metal should also have the desired physical properties for the particular application in which the product will be used.

Composition

According to the present disclosure, the wire 500 is formed of an aluminum-based alloy that comprises 0.01-10 wt % scandium and the remainder aluminum and unavoidable impurities. The aluminum alloy wire 500 may optionally include at least one of 0.01-4 wt % zirconium, 0.01-4 wt % rare earth metals, 0.01-20 wt % magnesium, and 0.01-3 wt % manganese. Oxygen, hydrogen, nitrogen, and/or titanium may also be present in the aluminum alloy wire 500 at low levels—≤10,000 ppm oxygen, ≤5,000 ppm hydrogen, ≤5,000 ppm nitrogen, and ≤15,000 ppm titanium.

Scandium (Sc)—When the aluminum alloy wire 500 is rapidly quenched during the deposition in the additive processing operation, scandium added to the aluminum alloy forms Al₃Sc precipitates which strengthen the deposited metal by precipitation strengthening and acting as nucleation sites that reduce the grain size of the deposited aluminum alloy. In cases where multiples layers of the aluminum alloy are deposited, one on top of the other, such that the deposited aluminum alloy is subjected to repeated heating and cooling cycles, which may also include some melting, the precipitates limit excessive grain growth in the previously deposited layers. Such grain growth may occur at temperatures from 275-650°. In the absence of such precipitates in a sufficient amount, insufficient strength may be achieved and grain growth and subsequent cracking of the deposited aluminum alloy can occur. In order to provide such beneficial effects, at least 0.01 wt % Sc is provided. However, if the Sc is present in an amount greater than 10 wt %, the benefits provided by the Sc diminish. Therefore, the aluminum alloy wire 500 comprises 0.01-10 wt % Sc, for example, 0.01-5 wt % Sc, 0.01-2 wt % Sc, or 0.01-1 wt % Sc.

Zirconium (Zr)—An addition of Zr to the aluminum alloy wire 500 results in $Al_3Sc$ precipitates that are doped with Zr, which further improves the beneficial effects provided by these precipitates and provides further grain refinement. In order to provide such beneficial effects, at least 0.01 wt % Zr may be provided. However, if the Zr is present in an amount greater than 4 wt %, the benefits provided by the Zr diminish. Therefore, the aluminum alloy wire 500 may comprise 0.01-4 wt % Zr, for example, 0.01-3 wt % Zr, 0.01-2 wt %, Zr, 0.01-1 wt % Zr, or 0.01-0.06 wt % Zr.

Rare Earth Metals (REM)—Rare earth metals include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). An addition of one or more rare earth metals to the aluminum alloy wire 500 results in $Al_3Sc$ precipitates that are doped with one or more rare earth metals, which further improves the beneficial effects provided by these precipitates. In order to provide such beneficial effects, a total of at least 0.01 wt % of rare earth metals may be provided. However, if the one or more rare earth metals are present in an amount greater than 4 wt %, the benefits provided by the one or more rare earth metals diminish. Therefore, the aluminum alloy wire 500 may comprise 0.01-4 wt % of one or more rare earth metals, for example, 0.01-3 wt % of one or more rare earth metals, 0.01-2 wt % of one or more rare earth metals, 0.01-1 wt % of one or more rare earth metals, or 0.01-0.06 wt % of one or more rare earth metals.

Magnesium (Mg)—Magnesium increases the strength of the aluminum alloy wire 500 and the deposited aluminum alloy by solid solution strengthening and also increases the ability of the aluminum alloy to strain harden. In order to provide such beneficial effects, at least 0.01 wt % Mg may be provided. However, if Mg is present in an amount greater than 20 wt %, the creep resistance of the aluminum alloy wire 500 may be reduced. Creep is a slow, time-dependent, irreversible process of plastic deformation that occurs when the aluminum alloy is subjected to stresses which are lower than the yield strength of the material. The long-term application of these stresses causes strain accumulation and/or stress relaxation and can influence inter-granular cracking and void growth over time. Both temperature and mechanical stress can influence creep, with temperature being the primary factor. Therefore, the aluminum alloy wire 500 may comprise 0.01-20 wt % Mg, for example, 0.01-16 wt % Mg, 0.01-13 wt % Mg, 0.01-10 wt % Mg, or 0.01-7 wt % Mg.

Manganese (Mn)—Manganese increases the strength of the aluminum alloy wire 500 and the deposited aluminum alloy by solid solution strengthening and also increases the ability of the aluminum alloy to strain harden. Manganese also increases the strength of the aluminum alloy at elevated temperatures. In order to provide such beneficial effects, at least 0.01 wt % Mn may be provided. However, if Mn is present in an amount greater than 3 wt %, the probability of the formation of large $Al_6Mn$ particles increases, which may decrease ductility and promote cracking of the aluminum alloy. Therefore, the aluminum alloy wire 500 may comprise 0.01-3 wt % Mn, for example, 0.01-2 wt % Mn, 0.01-1 wt % Mn, 0.01-1.5 wt % Mn, or 0.01-1.2 wt % Mn.

Oxygen (O)—Oxygen in the aluminum alloy wire 500 is kept as low as possible in order to avoid the formation of oxides which can interfere with the performance of the aluminum alloy wire 500 in additive processing operations, for example, affecting the feeding of the aluminum alloy wire 500, and can cause oxide defects in the deposited aluminum alloy. In order to avoid such negative effects, the oxygen content of the aluminum alloy wire is kept at or below 10,000 ppm. Therefore, the aluminum alloy wire 500 may comprise ≤10,000 ppm O, for example, ≤5,000 ppm O, ≤2,000 ppm O, ≤1,000 ppm O, or ≤600 ppm O.

Hydrogen (H)—Hydrogen in the aluminum alloy wire 500 is kept as low as possible in order to avoid brittleness in the aluminum alloy wire 500 and the deposited aluminum alloy and to avoid pores which may form in the deposited aluminum alloy. In order to avoid such negative effects, the hydrogen content of the aluminum alloy wire 500 is kept at or below 5,000 ppm. Therefore, the aluminum alloy wire 500 may comprise ≤5,000 ppm H, for example, ≤2,000 ppm H, ≤1,000 ppm H, ≤500 ppm H, or ≤200 ppm H.

Nitrogen (N)—Nitrogen in the aluminum alloy wire 500 is kept as low as possible in order to avoid brittleness in the aluminum alloy wire 500 and the deposited aluminum alloy and to avoid defects which may form in the deposited aluminum alloy. In order to avoid such negative effects, the nitrogen content of the aluminum alloy wire 500 is kept at or below 5,000 ppm. Therefore, the aluminum alloy wire 500 may comprise ≤5,000 ppm N, for example, ≤2,000 ppm N, ≤1,000 ppm N, ≤500 ppm N, or ≤300 ppm N.

Titanium (Ti)—Titanium in the aluminum alloy wire 500 is kept as low as possible in order to avoid the formation of titanium aluminides (TiAl) which have low ductility. In order to avoid such negative effects, the titanium content of the aluminum alloy wire 500 is kept at or below 15,000 ppm. Therefore, the aluminum alloy wire 500 may comprise ≤15,000 ppm Ti, for example, ≤10,000 ppm Ti, ≤7,000 ppm Ti, ≤5,000 ppm Ti, or ≤3,000 ppm Ti.

Diameter

Figure 1:
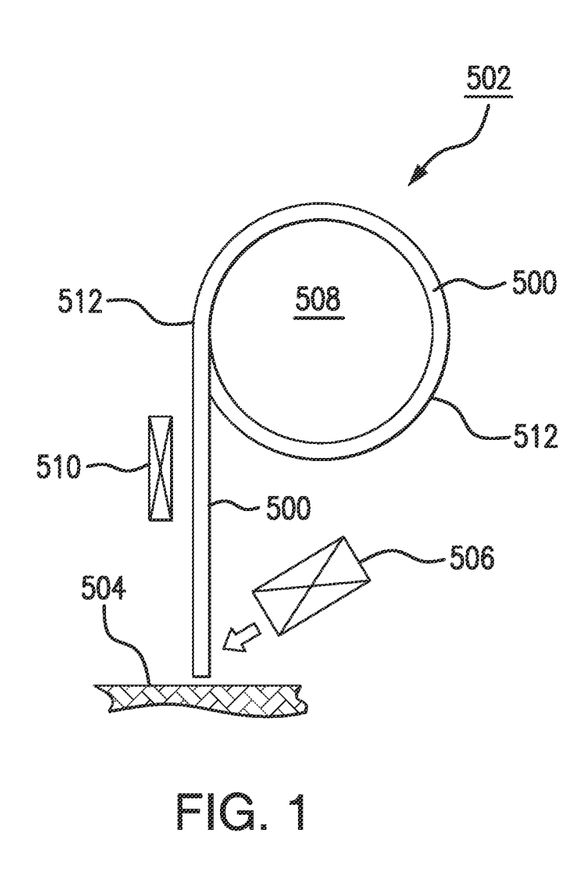
FIG. 1 is a schematic view of an apparatus for performing an additive process.

In the example illustrated in FIG. 1, the aluminum alloy wire 500 is stored on a suitable spool 508 and is fed toward the desired location on the deposition surface 504 by a suitable feeding means 510. The aluminum alloy wire 500 has an effective diameter of 6 mm or less, preferably, 4 mm or less, and more preferably, 2 mm or less. In the event that the cross section of the aluminum alloy wire 500 is not circular, the area of the non-circular cross section may be used to calculate the radius of an equivalent circle. The effective diameter of the wire is two times the radius of the equivalent circle. In additive processing operations, the rapid cooling of the deposited aluminum alloy must be sufficient to develop the required microstructure and other characteristics that provide the deposited aluminum alloy with the desired physical properties. A smaller diameter wire can aid in providing the necessary cooling rate. In addition, a smaller diameter wire requires less energy to melt and results in lower heat which can reduce grain growth in the layer of aluminum alloy being deposited and in previously deposited aluminum alloy layers. However, wires having smaller diameters can have an undesirable amount of flexure which increases the difficulty of providing the wire to the precise location where the aluminum alloy is to be deposited in additive processing operations. This can present a challenge when trying to deposit an aluminum alloy having a precisely controlled geometry, for example, during 3D printing.

As will be discussed further, the aluminum alloy wire 500 has characteristics that minimize flexure and improve the ability of the aluminum alloy wire 500 to be guided to a precise location when used in additive processing operations.

Surface Roughness

The surface roughness of the aluminum alloy wire 500 as measured in the longitudinal direction is different from the surface roughness of the aluminum alloy wire 500 as measured in the lateral direction. The longitudinal direction is the direction parallel to the central axis of the aluminum alloy wire 500, and the lateral direction is the direction perpendicular to the central axis of the aluminum alloy wire 500, i.e., the circumferential direction.

Figure 2:
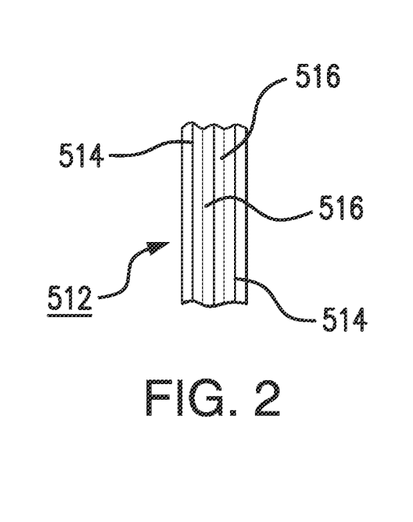
FIG. 2 is an enlarged side view of a portion of a wire within the apparatus of FIG. 1.

The aluminum alloy wire 500 has an outer surface 512 (FIG. 2) comprising grooves extending in the longitudinal direction. The grooves comprise alternating ridges 514 and troughs 516. The ridges and troughs may vary in shape. The depth of the grooves as measured from the lowest portion of a trough to the highest portion of the adjacent ridge may vary.

The longitudinal surface roughness Ra (longitudinal) of the aluminum alloy wire 500, measured in the longitudinal direction, may be characterized by traversing a stylus across the aluminum alloy wire surface in the longitudinal direction. The longitudinal surface roughness Ra (longitudinal) may also be characterized by using an optical profilometer, within the trough of a groove, on the top of a ridge, or in a direction substantially parallel to a groove or a ridge along the longitudinal direction of the aluminum alloy wire 500.

The lateral surface roughness Ra (lateral) of the aluminum alloy wire 500, measured in the lateral direction, may be characterized by traversing a stylus around a perimeter of the aluminum alloy wire 500. The lateral surface roughness Ra (lateral) may also be characterized by preparing a metallographic cross-section of the aluminum alloy wire or using an optical profilometer as long as the curved surface of the aluminum alloy wire is kept in focus.

Figure 3:
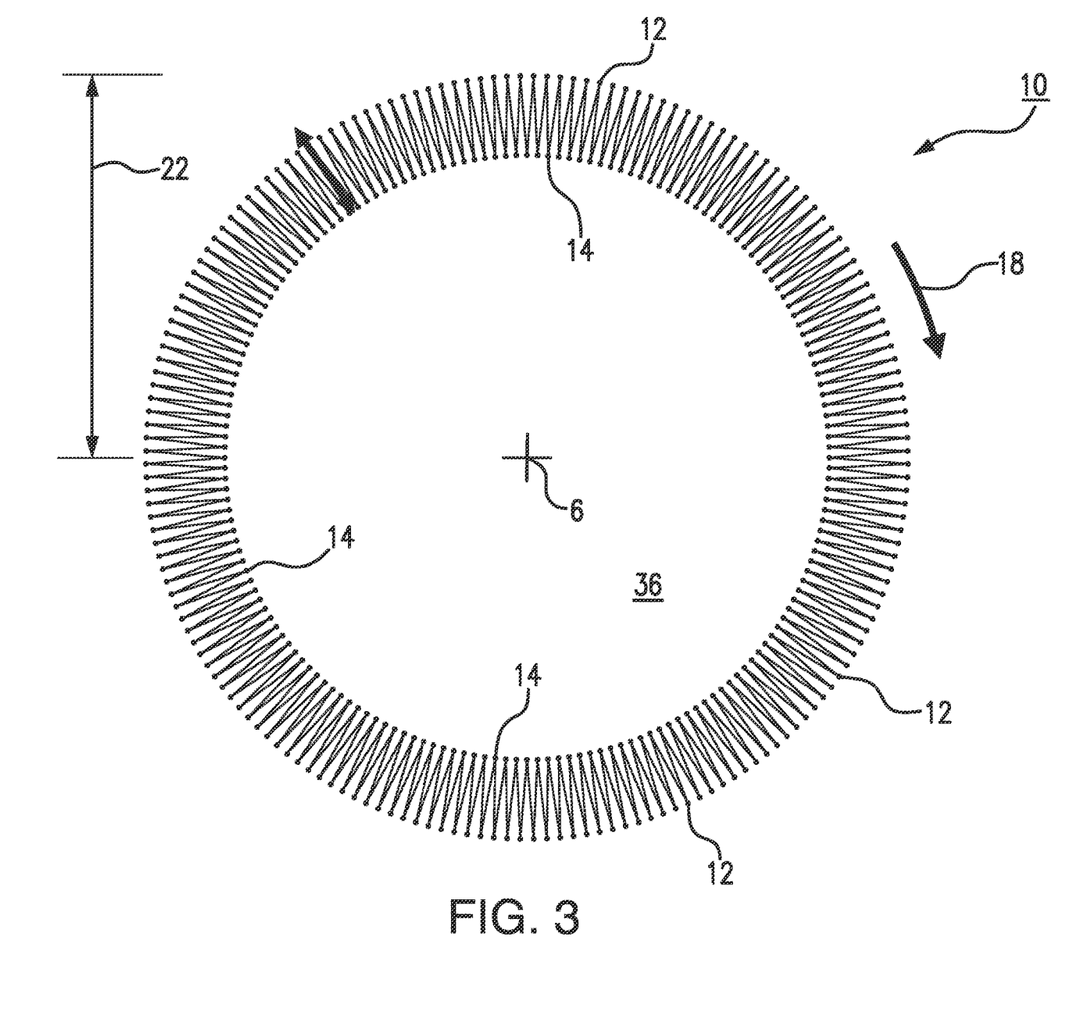
FIG. 3 is an end view of an aluminum alloy wire having grooves having a depth of 0.2 mm and extending in the longitudinal direction of the wire.

Certain principles of the present disclosure are explained below in connection with comparative examples illustrated in FIGS. 3-12. Thus, FIG. 3 shows a simplified geometric model of an aluminum alloy wire 10 that has a uniform distribution of ridges 12 and troughs 14 extending in the longitudinal direction. The longitudinal direction of the wire 10 is aligned with the central axis 16 of the wire 10, and is perpendicular to the lateral direction 18 of the wire 10. The average depth of the grooves, measured from the radially outermost portions of the ridges 12 to the radially innermost portions of the troughs 14, is 0.2 mm, the nominal radius 22 of the wire 10 is 0.9907 mm, the effective radius of the wire 10 is 0.885 mm, and the lateral surface roughness Ra (lateral) of the wire 10, measured in the lateral direction 18, is 50 The effective radius of the wire 10 is less than its nominal radius 22 because the spaces between the ridges 12 do not contain aluminum alloy.

Figure 4:
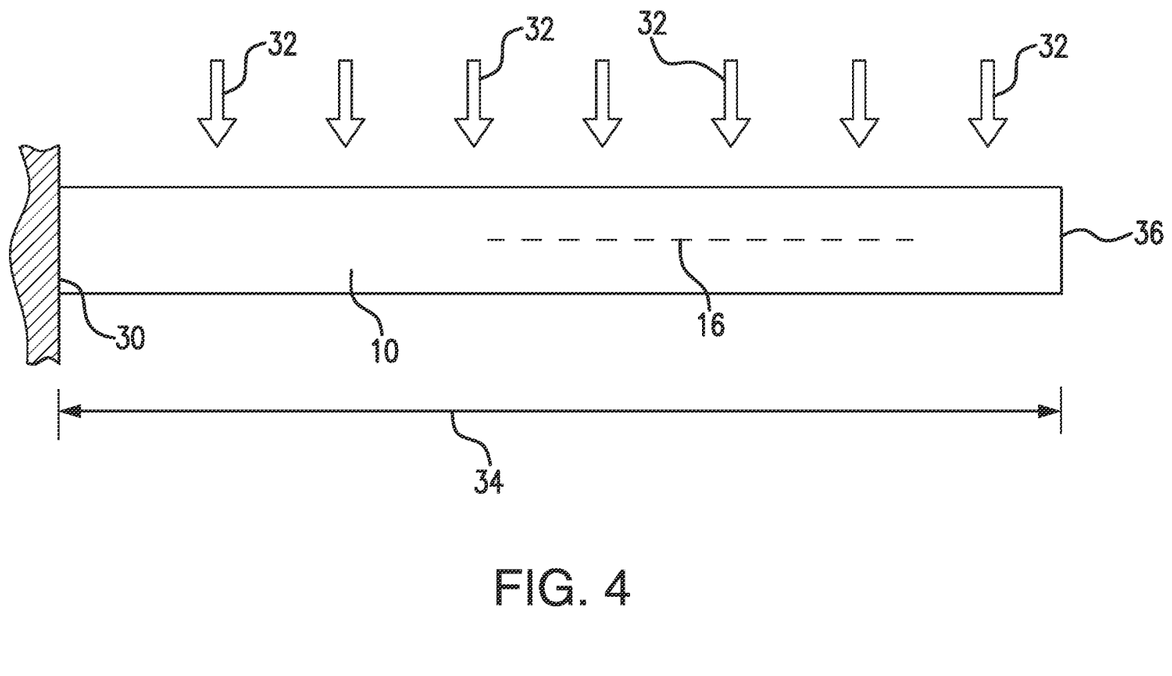
FIG. 4 is a side view of the wire of FIG. 3, showing deflection of the wire, where the wire has a length of 20 mm, is fixed at one end, and is subjected to force of 1,000 N uniformly applied along the length of the wire.

As shown in FIG. 4, in order to characterize the flexure of the aluminum alloy wire 10, one end 30 of the aluminum alloy wire 10 is fixed, and the displacement that results from a force 32 applied perpendicularly to the central axis 16 of the aluminum alloy wire 10 and uniformly distributed along the length of the aluminum alloy wire 10 is measured. A larger displacement indicates that the aluminum alloy wire 10 has more flexure, making it more difficult for the feeding means 510 to guide the wire 10 to a precise location when used in additive processing operations.

Figure 5:
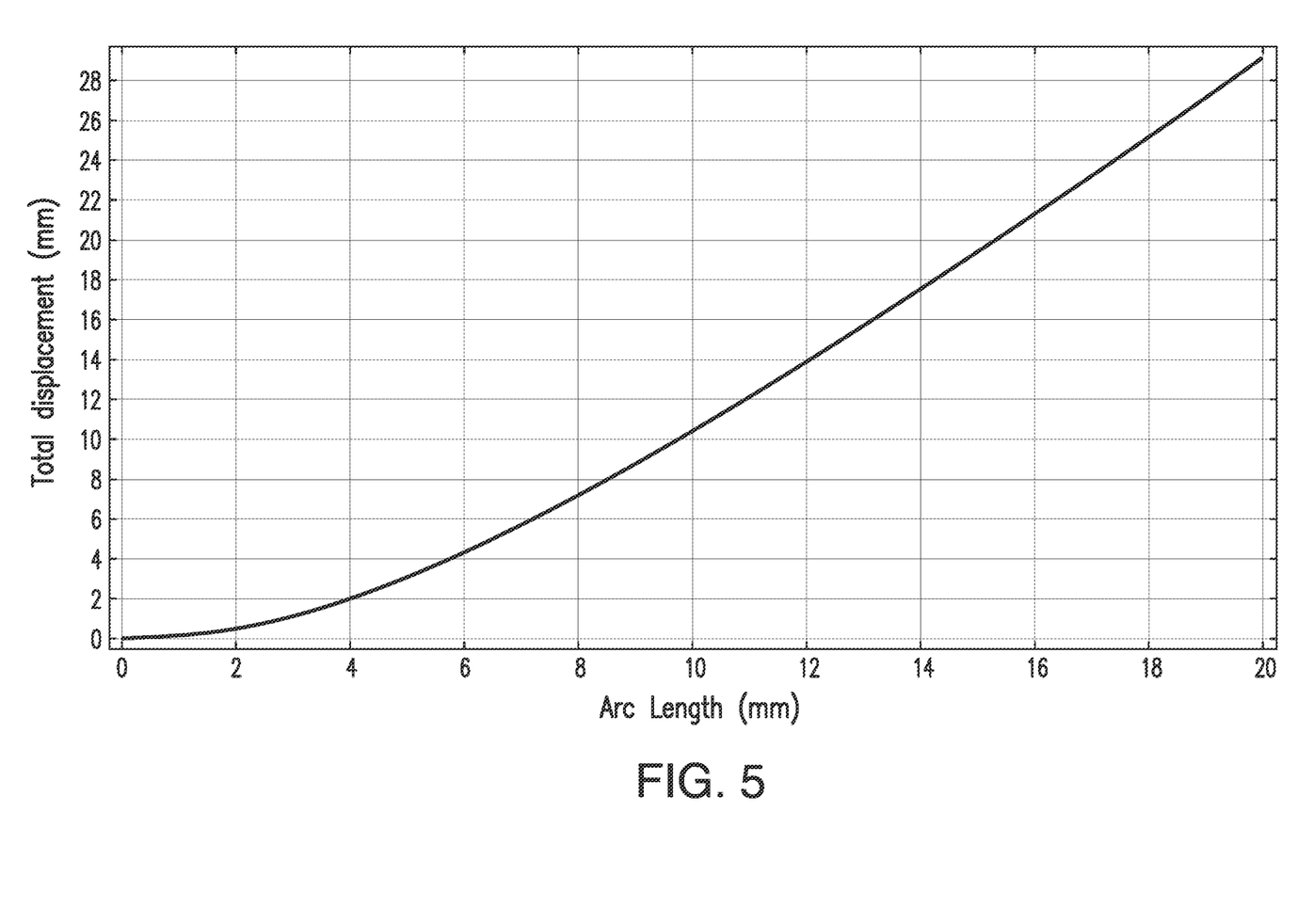
FIG. 5 is a graph showing displacement of the wire of FIGS. 3 and 4.

When the aluminum alloy wire 10 of FIG. 3 has an effective radius of 0.885 mm with a nominal outer radius 22 of 0.9907 mm, an average groove depth of 0.2 mm, which is equivalent to a lateral surface roughness Ra (lateral), measured in the lateral direction, of 50 µm, and a length 34 of 20 mm is subjected to a 1,000 Newton force 32 applied uniformly along the length 34 of the aluminum alloy wire 10 and perpendicular to the central axis 16 of the aluminum alloy wire 10, the free end 36 of the aluminum alloy wire 10 (where arc length equals 20 mm) has a displacement of 29 mm, while the fixed end 30 of the wire 10 (where arc length equals zero) has zero displacement, as shown in FIG. 5.

Figure 6:
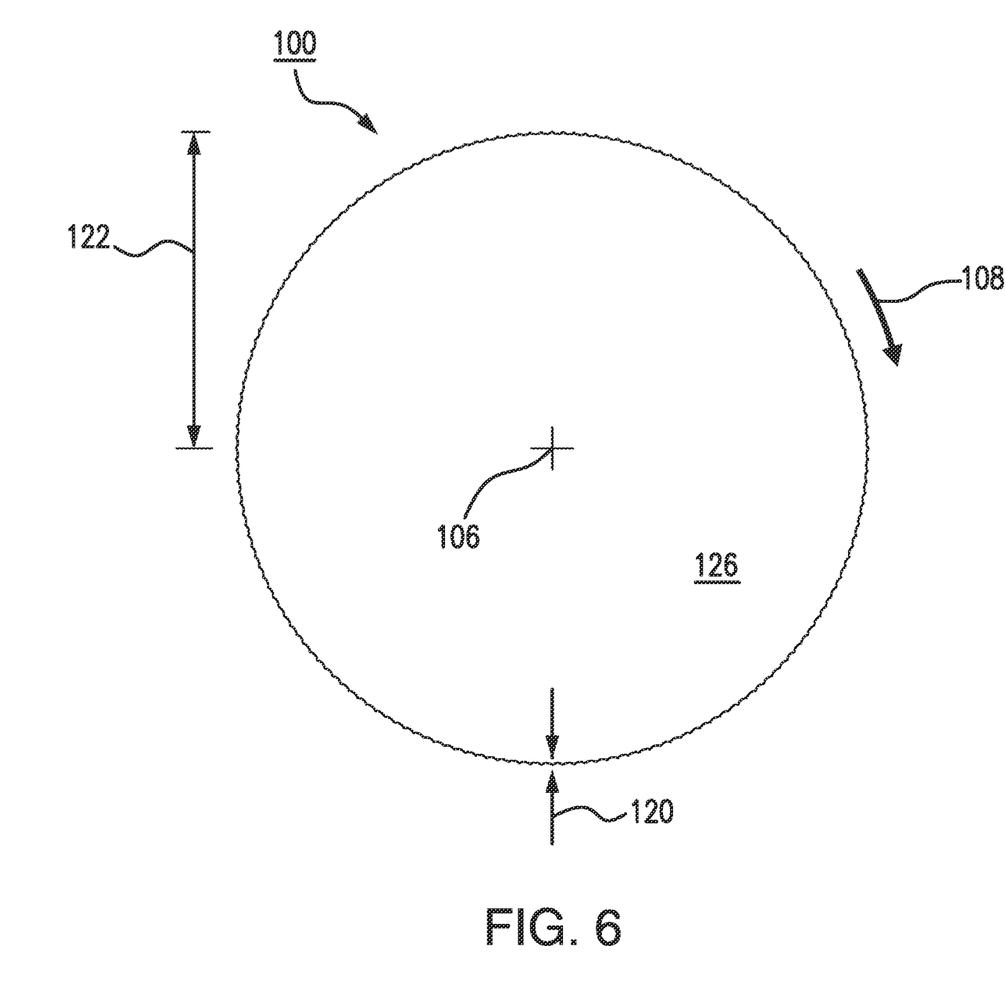
FIG. 6 is an end view of an aluminum alloy wire having grooves having a depth of 0.005 mm and extending in the longitudinal direction of the wire.
Figure 7:
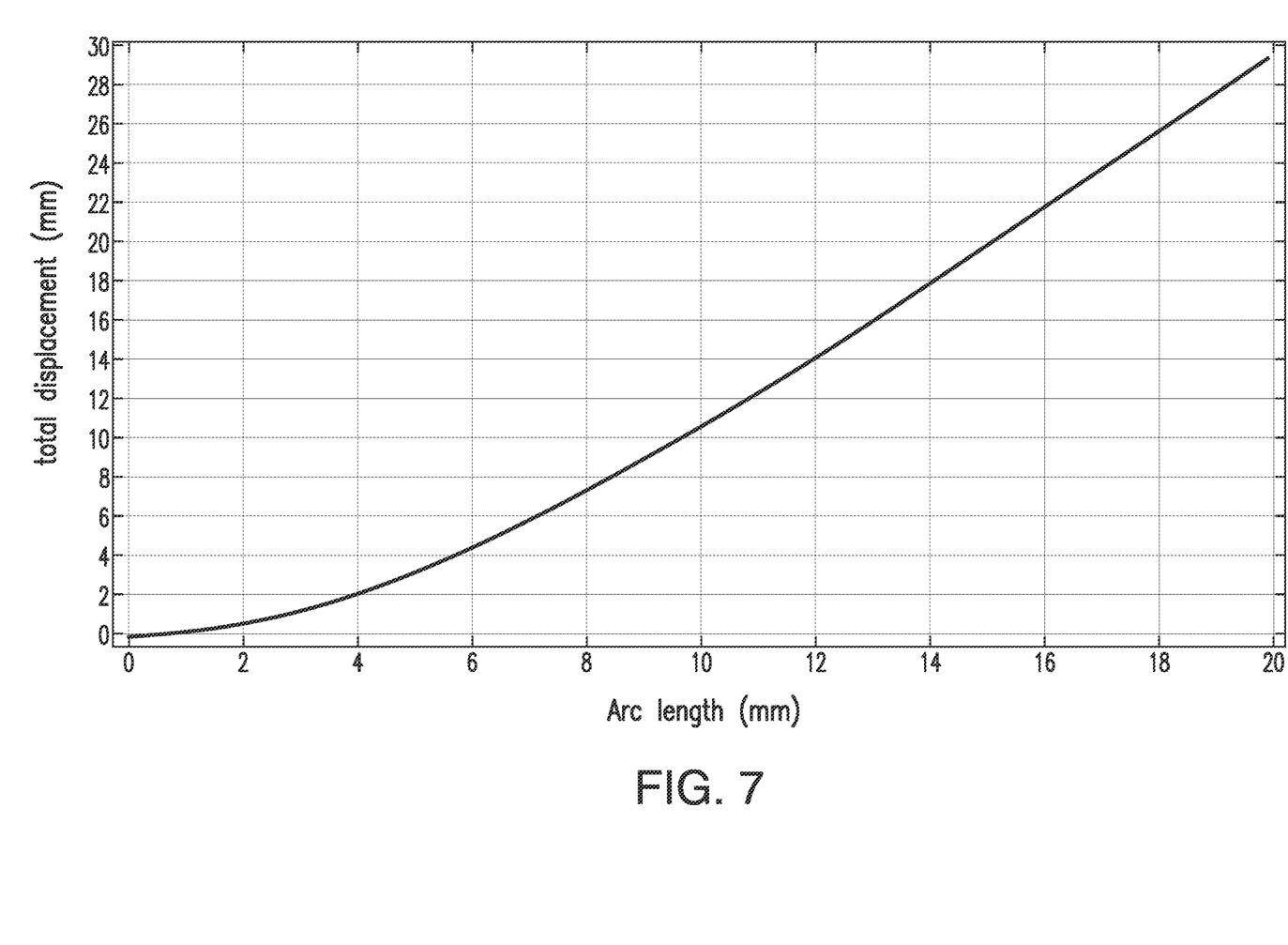
FIG. 7 is a graph showing displacement of the wire of FIG. 6.

FIG. 6 shows a simplified geometric model of another aluminum alloy wire 100 that has a uniform distribution of ridges and troughs extending in the longitudinal direction. The longitudinal direction of the wire 100 is aligned with the central axis 106 of the wire 100, and is perpendicular to the lateral direction 108 of the wire 100. The average depth 120 of the grooves, measured from the radially outermost portions of the ridges to the radially innermost portions of the troughs, is 0.005 mm, the nominal radius 122 of the wire 100 is 0.9907 mm, and the lateral surface roughness Ra (lateral) of the wire 100, measured in the lateral direction 108, is 1.25 The wires 10, 100 illustrated in FIGS. 3 and 6 have the same length (20 mm), but different average groove depths, different values of lateral surface roughness Ra (lateral), and different displacements. The second wire 100 has a displacement of about 29.5 mm at the free end 126 of the aluminum alloy wire 100 when a 1,000 Newton force is applied uniformly along the length of the aluminum alloy wire 100 and perpendicular to the central axis 106 of the aluminum alloy wire 100, as shown in FIG. 7.

Turning now to FIGS. 8-11, grooves having ridges and troughs may be provided on the surface of an aluminum alloy wire along a lateral direction, i.e., around the circumference of the aluminum alloy wire. Like the longitudinal grooves illustrated above in connection with FIGS. 3-7, the ridges and troughs extending in the lateral direction may vary in shape, and the depth of the grooves may vary.

Figure 8:
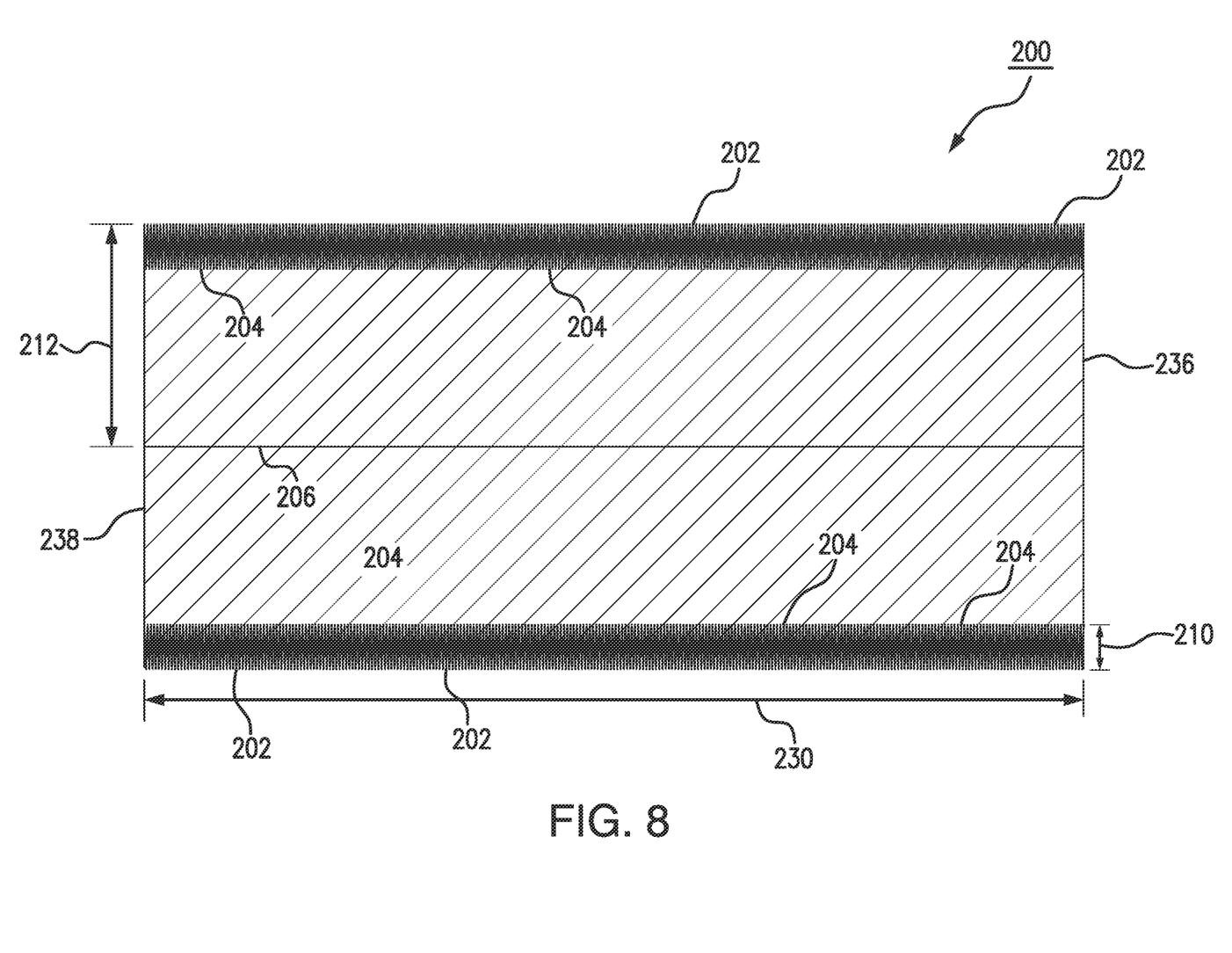
FIG. 8 is a cross-sectional view of an aluminum alloy wire, taken through a longitudinal axis of the wire, where the wire has grooves having a depth of 0.2 mm and extending in the lateral direction of the wire.
Figure 9:
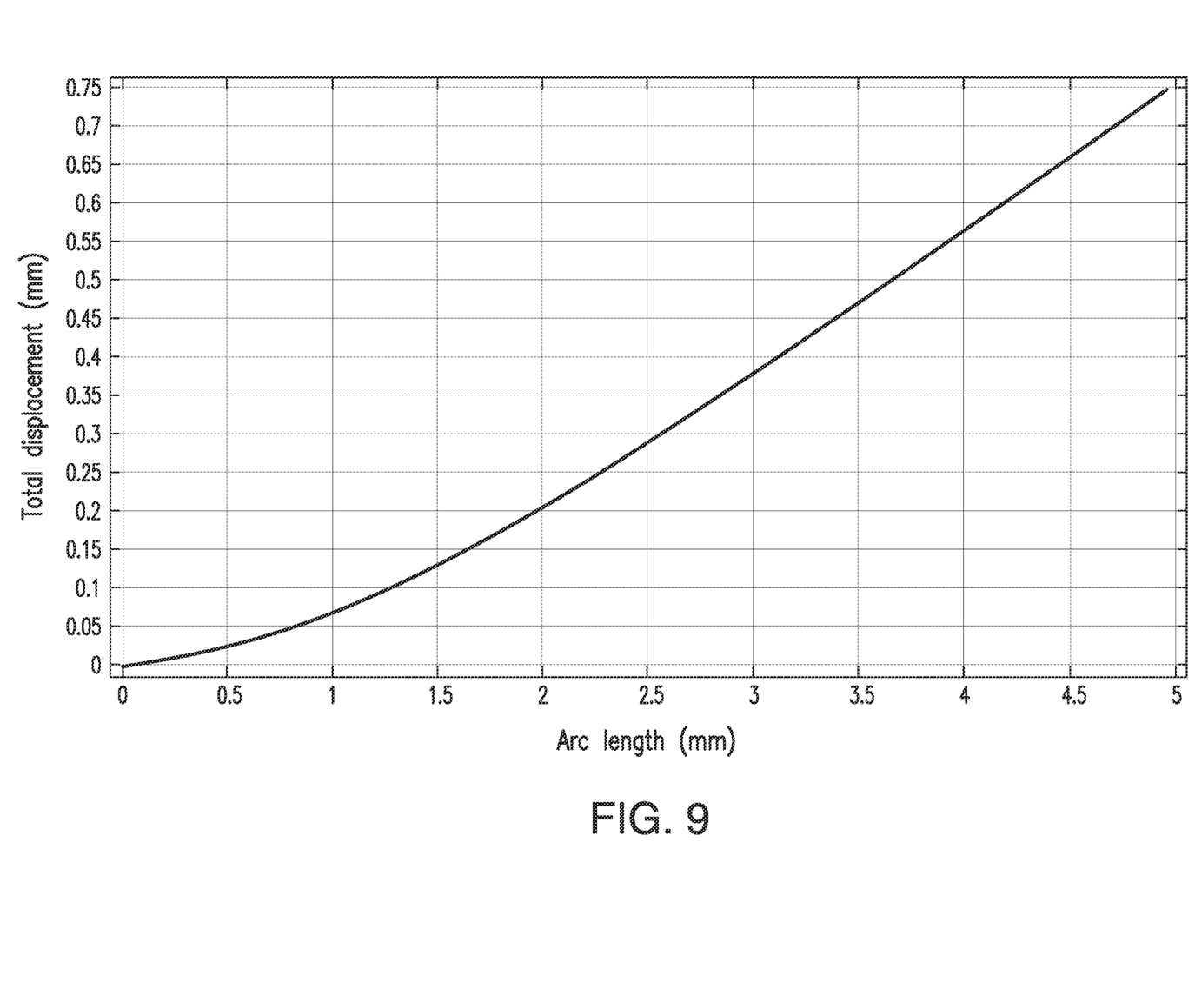
FIG. 9 is a graph showing displacement of the wire of FIG. 8.

FIG. 8 shows a simplified geometric model of an aluminum alloy wire 200 that has a uniform distribution of ridges 202 and troughs 204 extending in the lateral direction. The longitudinal direction of the wire 200 is aligned with the central axis 206 of the wire 200, and is perpendicular to the lateral direction of the wire 200. The average depth 210 of the grooves, measured from the radially outermost portions of the ridges 202 to the radially innermost portions of the troughs 204, is 0.2 mm, the nominal radius 212 of the wire 200 is 0.9832 mm, the effective radius of the wire 200 is 0.885 mm, and the longitudinal surface roughness Ra (longitudinal) of the wire 200, measured in the longitudinal direction, is 50 µm. When such an aluminum alloy wire 200 having a length 230 of 5 mm, an equivalent radius of 0.885 mm, and an average groove depth 210 of 0.2 mm, which is equivalent to a longitudinal surface roughness Ra (longitudinal) of about 50 μm, is subjected to a 1,000 Newton force applied uniformly along the length of the aluminum alloy wire 200 and perpendicular to the central axis 206 of the aluminum alloy wire 200, a free end 236 of the aluminum alloy wire 200 has a displacement of 0.74 mm, while a fixed end 238 of the wire 200 has zero displacement, as shown in FIG. 9.

Figure 10:
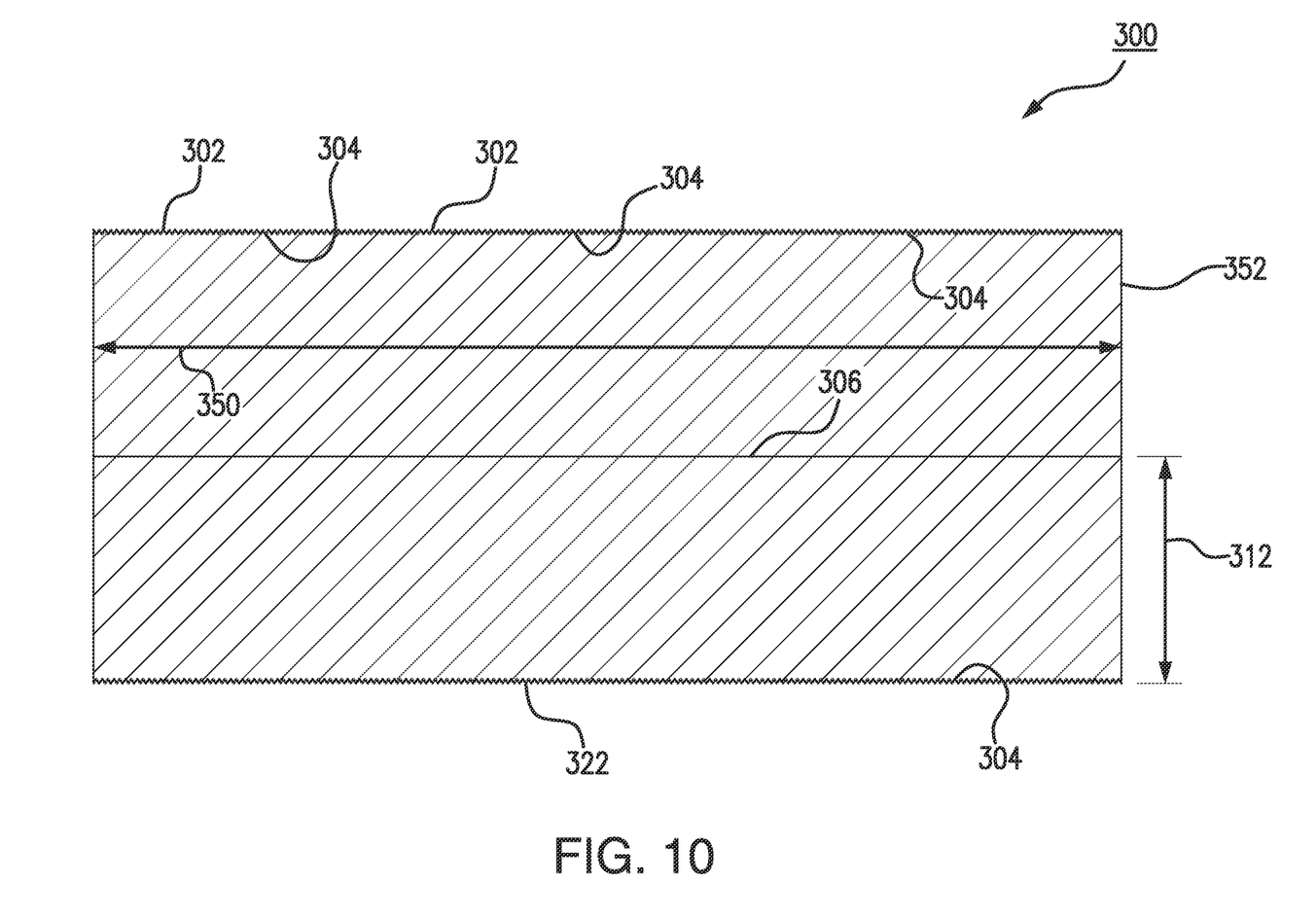
FIG. 10 is a cross-sectional view of an aluminum alloy wire, taken through a longitudinal axis of the wire, where the wire has grooves having a depth of 0.005 mm and extending in the lateral direction of the wire.
Figure 11:
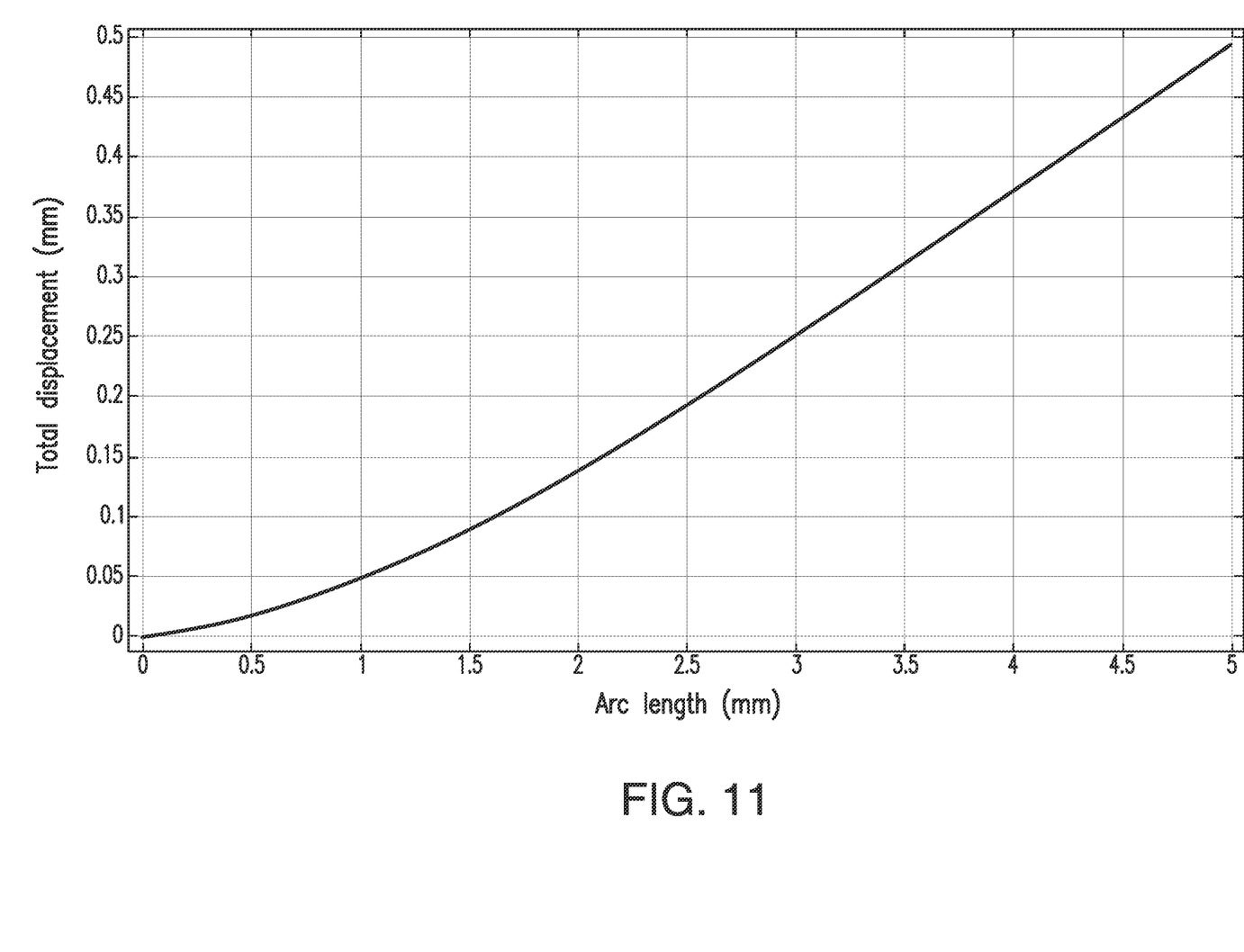
FIG. 11 is a graph showing displacement of the wire of FIG. 10.

FIG. 10 shows a simplified geometric model of an aluminum alloy wire 300 that has a uniform distribution of ridges 302 and troughs 304 extending in the lateral direction. The longitudinal direction of the wire 300 is aligned with the central axis 306 of the wire 300, and is perpendicular to the lateral direction of the wire 300. The average depth of the grooves, measured from the radially outermost portions of the ridges 302 to the radially innermost portions of the troughs 304, is 0.005 mm, the nominal radius 312 of the wire 300 is 0.8875 mm, the effective radius of the wire 10 is 0.885 mm, and the longitudinal surface roughness Ra (longitudinal) of the wire 300, measured in the longitudinal direction, is 1.25 μm. The aluminum alloy wires 200, 300 illustrated in FIGS. 8 and 10 have the same effective radius (0.885 mm) and length (5 mm), but the wire 300 shown in FIG. 10 has an average groove depth of 0.005 mm, which is equivalent to a longitudinal surface roughness Ra (longitudinal), measured in the longitudinal direction, of 1.25 μm, such that the wire 300 has a displacement of about 0.49 mm at the free end 352 of the aluminum alloy wire 300 when a 1,000 Newton force is applied uniformly along the length of the aluminum alloy wire 300 and perpendicular to the central axis 316 of the aluminum alloy wire 300, as shown in FIG. 11.

Thus, a reduction in the flexure of an aluminum alloy wire is unexpectedly provided by providing grooves that increase the surface roughness as measured in the lateral direction, and an increase in the flexure of the aluminum alloy wire is unexpectedly provided by providing grooves that increase the surface roughness as measured in the longitudinal direction.

Figure 12:
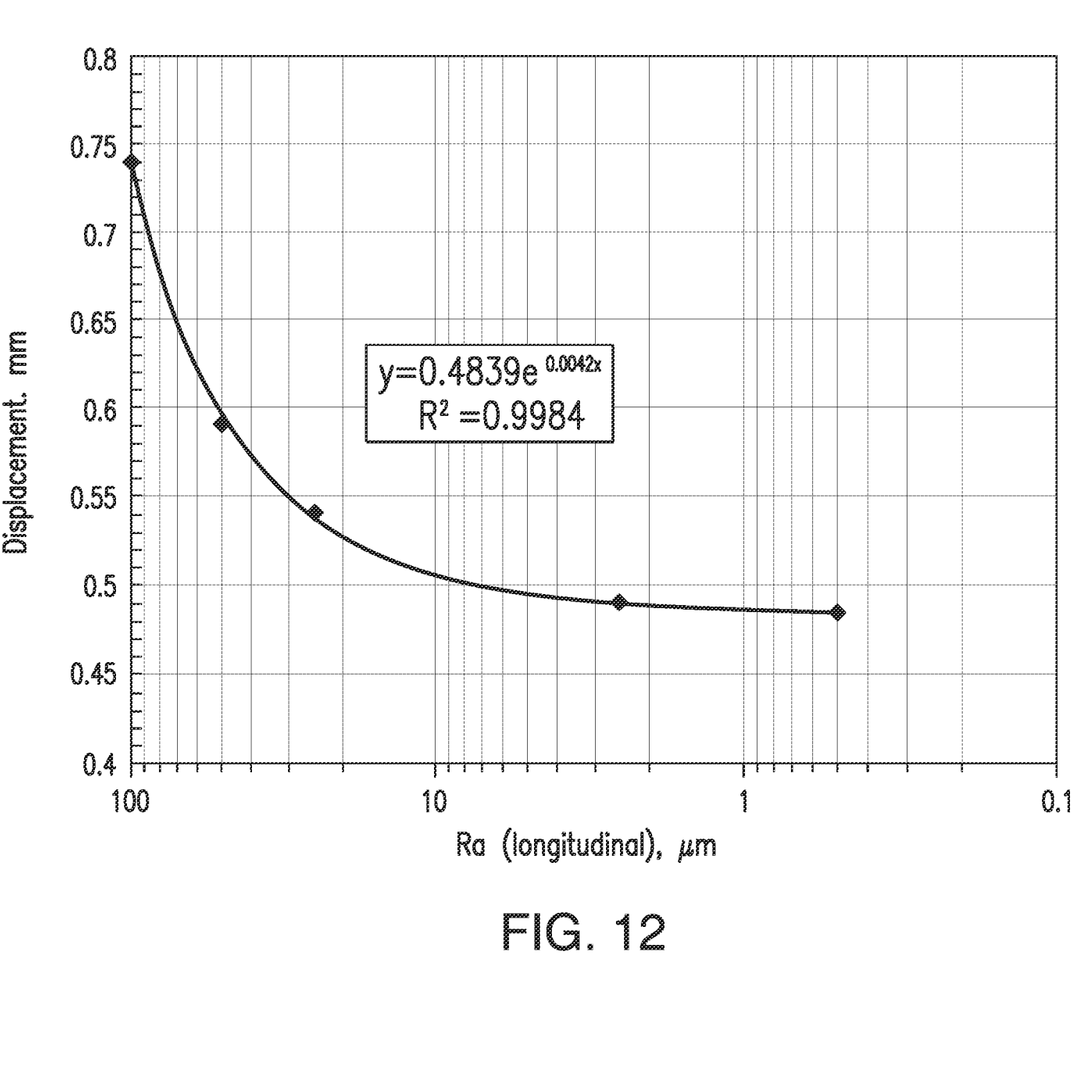
FIG. 12 is a graph showing displacement of an aluminum alloy wire having grooves extending in the longitudinal direction of the wire as a function of the surface roughness of the wire in the longitudinal direction.

Further, FIG. 12 shows the effect of the longitudinal surface roughness Ra (longitudinal) on the flexure, as measured by the displacement under load, for an aluminum alloy wire having grooves extending in the longitudinal direction and a length of 5 mm. When the longitudinal surface roughness Ra (longitudinal), i.e., the surface roughness measured along the length of the grooves, in the longitudinal direction of the wire, is reduced to 2.5 μm or less, the flexure (displacement) of the aluminum alloy wire is minimized.

Therefore, in order to assist in providing the aluminum alloy wire with sufficient resistance to flexure, the aluminum alloy wire 500 (FIG. 1) may have a lateral surface roughness Ra (lateral), as measured in the lateral direction, of ≥0.3 μm, ≥0.5 μm, ≥0.8 μm, ≥1.2 μm, ≥1.7 μm, or ≥2.5 μm. The aluminum alloy wire may also have a longitudinal surface roughness Ra (longitudinal), as measured in the longitudinal direction, of ≤2.5 μm, ≤1.5 μm, ≤1.0 μm, or ≤0.5 μm. Further, the surface roughness ratio (SRR=Ra (lateral)/Ra (longitudinal)) of the lateral surface roughness Ra (lateral), measured in the lateral direction, to the longitudinal surface roughness Ra (longitudinal), measured in the longitudinal direction, may be ≥1.5, ≥2.0, ≥2.5, ≥3.0, or ≥5.0.

Such a roughness may be provided by the presence of grooves in the surface 512 (FIG. 2) of the aluminum alloy wire, extending in the longitudinal direction of the aluminum alloy wire, where the roughness along the ridges 514 and troughs 516 of the grooves is minimized. Such a resistance to flexure will allow the aluminum alloy wire 500 to be guided by the guide means 510 more precisely during additive processing operations, such as 3D printing.

In addition, provision of the grooves in the surface of the aluminum alloy wire 500 extending in the longitudinal direction of the aluminum alloy wire will reduce the light reflection of the aluminum alloy wire 500. A smooth surface having a surface roughness of less than 0.001 μm, may have a reflectivity of 0.8746 for a non-polarized light, 0.7546 for a P-polarized laser, and 0.9946 for a S-polarized laser at a wavelength of 1.06 μm with an incident of Brewster's angle of 84.313°. For a $CO_2$ laser having a wavelength of 10.6 μm, the Brewster angle is 89.365°, the reflectivity is 0.7912 for a non-polarized light, 0.5826 for a P-polarized laser, and 0.9999 for an S-polarized laser. This suggests that, in additive processing operations that utilize a laser 506 for melting an aluminum alloy wire, the highest efficiency that a laser at 1,064 nm can have is about 25% when the aluminum alloy wire has a surface roughness of less than 0.020 μm, and a laser having a wavelength of 10.6 micron may only achieve an efficiency of 41.74% for the same aluminum alloy wire. The aluminum alloy wire 500 of the present disclosure, having a grooved surface with a surface roughness of ≥0.3 μm as measured in the lateral direction, effectively changes the light paths of the reflected laser light providing more opportunities for the laser light to be absorbed prior to its complete reflection from the aluminum alloy wire surface 512 which can result in higher efficiency.

Further, the provision of the grooves in the surface of the aluminum alloy wire 500 extending in the longitudinal direction of the aluminum alloy wire 500 that result in the aluminum alloy wire 500 having the recited Ra (lateral) and Ra (longitudinal) should not disrupt the stability of the arc when used in an additive processing operation that utilizes an electric arc or plasma arc for depositing the aluminum alloy.

Also, when the Ra (longitudinal) is large, for example, ≥2.5 μm, variations in the diameter of an aluminum alloy wire are present that can lead to variations or instability during melting of the aluminum alloy wire by arc, plasma, or laser, which can result in undesirable results for additive processing operations such as 3D additive manufacturing.

Surface Quality

According to the present disclosure, surface defects and embedded particles of oxides and/or other contaminants on the surface 512 of the aluminum alloy wire 500 may be minimized.

Such surface defects may be pits, non-longitudinal scratches extending through the ridges of the grooves, over-oxidized areas, and embedded particles of foreign material. Embedded particles may include oxygen (in the form of an oxide), chlorine (in the form of a chloride), and/or carbon and may comprise aluminum, silicon, iron, calcium, sodium, and/or potassium. They may be shop dirt from the manufacturing environment, particles from the tooling used to manufacture the aluminum alloy wire (hard steel, carbide, refractory metal, etc.), or particles of the aluminum alloy of the aluminum alloy wire.

The quantity of surface defects may be determined by examining the surface of the aluminum alloy wire under magnification using an optical microscope or a scanning electron microscope. The size of these surface defects may be from 50 nm or smaller to a few hundred microns or larger. These surface defects may result in defects in the deposited aluminum alloy when the aluminum alloy wire is used in additive processing operations. Such defects may include pores, inclusions, and discontinuous interfaces.

The total amount of surface defects (SIR) may be limited to a maximum of 10% of the outer surface area of the aluminum alloy wire, for example, 7% of the outer surface area of the aluminum alloy wire, 5% of the outer surface area of the aluminum alloy wire, 3% of the outer surface area of the aluminum alloy wire, or 1% of the outer surface area of the aluminum alloy wire. The total amount of surface defects may be measured by optical examination of the outer surface of the aluminum alloy wire at a magnification of 50X or greater. Such an examination may be made using an optical microscope, a stereoscope, a scanning electron microscope, or the like.

Amplitude Relaxing Ratio (ARR)

The amplitude relaxing ratio (ARR) of an aluminum alloy wire is defined herein as the ratio $D_{Relax}/D_{Spool}$, where $D_{Spool}$ is the diameter of a loop of the aluminum alloy wire while the aluminum alloy wire is wound tightly on a spool, and $D_{Relax}$ is the diameter of the loop of the aluminum alloy wire after the wire is allowed to relax. For example, a loop of an aluminum alloy wire wound tightly onto a spool having a diameter of 12 inches that has a relaxed diameter of 17 inches has an amplitude relaxing ratio of 1.42. The amplitude relaxing ratio of the aluminum alloy wire 500 may be greater than or equal to 1.05, for example, ≥1.10, ≥1.15, ≥1.20, ≥1.25, ≥1.30, or ≥1.35.

Period Relaxing Ratio (PRR)

The period relaxing ratio (PRR=$L_{Period}$/d) of an aluminum alloy wire is defined herein as the ratio of the nearest distance $L_{Period}$ between two adjacent spiral loops of a relaxed spooled aluminum alloy wire, measured from the center of the aluminum alloy wire of one spiral loop to the center of the aluminum alloy wire of the adjacent spiral loop, divided by the diameter d of the aluminum alloy wire. For example, when an aluminum alloy wire with a diameter of 1.2 mm is tightly spooled onto a 12 inch diameter spool such that distance between two adjacent spiral loops is zero, and if the aluminum alloy wire is then relaxed to a loop diameter of 17 inches, and the distance $L_{Period}$ between two adjacent spiral loops of the relaxed wire is 20 mm, then the period relaxing ratio (PRR) is 16.7 (20 mm/1.2 mm=16.7). The period relaxing ratio of the aluminum alloy wire 500 may be less than or equal to 60, for example, ≤50, ≤40, ≤30, or ≤25.

Surface Contaminants

Removable organic and inorganic contaminants on the outer surface of the aluminum alloy wire 500 should be minimized. Such contaminants may include oils, lubricants, and inorganic particles. The amount of contaminants can be determined by weighing the aluminum alloy wire, cleaning the aluminum alloy wire, reweighing the aluminum alloy wire, and determining the weight percent of the contaminants in terms of ppm. The aluminum alloy wire may have less than 5,000 ppm by weight of contaminants on its outer surface, for example, ≤3,000 ppm by weight, ≤1,000 ppm by weight, or ≤500 ppm by weight.

Such surface contaminants may be removed from the surface of the aluminum alloy wire by cleaning the aluminum alloy wire with water, a soap or detergent in water, or an organic solvent. Such cleaning may include agitation, spraying, ultrasonic, scrubbing, wiping, blowing of compressed air or another pressurized gas, and/or supercritical $CO_2$ cleaning. After cleaning, the aluminum alloy wire may be dried by a stream of compressed air or any pressurized gas that may be filtered to remove particles and contaminants. The cleaned aluminum alloy wire may be dried at room temperature in or at an elevated temperature. The aluminum alloy wire may be produced in a Class 100,000 or better clean room.

Mechanical Properties

The aluminum alloy wire 500 illustrated in FIG. 1 may have yield strength of at least 300 MPa, for example, at least 320 MPa, at least 340 MPa, at least 360 MPa, or at least 380 MPa, and may have a tensile strength of at least 320 MPa, for example, at least 320 MPa, at least 360 MPa, at least 400 MPa, or at least 450 MPa.

Manufacturability Factor

A manufacturability factor Q in terms of l/mm for the aluminum alloy wire 500 illustrated in FIG. 1 may be defined using the following formula: Q=ARR·SRR/(PRR·d·SIR·RSC), where ARR is the amplitude relaxing ratio, SRR is the surface roughness ratio—Ra (lateral)/Ra (longitudinal), PRR is the period relaxing ratio, d is the diameter of the aluminum alloy wire in mm, SIR is the surface imperfection ratio in percentage of the outer surface area represented as a decimal (e.g., 10% of the outer surface area is 0.1), and RSC is the surface contamination in terms of ppm by weight (e.g., 5000 ppm of surface contamination is RSC of 0.005).

Q may be a minimum of 8.75 l/mm and a maximum of 27,000 l/mm, for example, 8.75-27,000 l/mm, 50-10,000 l/mm, or 100-5,000 l/mm.

Method of Making the Aluminum Alloy Wire

An aluminum alloy having the above described composition is cast into a bar, having a diameter from a few inches up to 20 inches, for example, 2-20 inches. The aluminum alloy bar is deformed by stretching or by being drawn through one or more dies that reduce its diameter and increase its length, resulting in the wire 500 illustrated in FIG. 1, which has a smaller diameter and longer length than the bar. The desired lateral surface roughness Ra (lateral) and longitudinal surface roughness Ra (longitudinal) are achieved by adjusting the surface characteristics of the portion of the die that contacts the outer surface 512 of the aluminum alloy wire 500. The die (not shown in the drawings) may be provided with wear-resistance properties, for example, the die material may comprise ceramic material, diamond, silicon carbide, tungsten carbide, hard steel, stainless steel, and the like or may be coated with such materials.

For achieving the desired longitudinal surface roughness Ra (longitudinal), clamping of the aluminum alloy wire may be minimized as clamping may create an undesirable longitudinal surface roughness Ra (longitudinal). If wire clamping is necessary, the clamping tool or wheel may have a surface roughness in the drawing direction of the aluminum alloy wire that is less than or equal to the desired longitudinal surface roughness Ra (longitudinal). The surface of the clamping tool may be lined with other another material, for example, a polymer such as nylon, polyurethane, polyimide, polyolefin, or the like or a metal.

If desired, the aluminum alloy wire 500 may be cleaned with water, a soap or detergent in water, or an organic solvent before being wound onto a spool 502. Such cleaning may include agitation, spraying, ultrasonic, scrubbing, wiping, blowing of compressed air or another pressurized gas, and/or supercritical $CO_2$ cleaning. After cleaning, the aluminum alloy wire may be dried by a stream of compressed air or any pressurized gas that may be filtered to remove particles and contaminants. The cleaned aluminum alloy wire may be dried at room temperature in or at an elevated temperature. The aluminum alloy wire may be produced in a Class 100,000 or better clean room.

EXAMPLES

The wire 500 may have a nominal diameter of 1.2 mm and may be prepared according to the present disclosure including cleaning before spooling. If desired, the wire may have the properties of Example 1 or Example 2 listed in Table 1:

TABLE 1

|  | Example 1 | Example 2 |
|---|---|---|
| Al, wt % | Balance | Balance |
| SC, % | 0.72 | 0.78 |
| Mg, wt % | 4.70 | 4.6 |
| Zr, wt % | 0.36 | 0.34 |
| Mn, wt % | 0.50 | 0.46 |
| Fe, wt % | 0.04 | 0.041 |
| Si, wt % | 0.04 | 0.041 |
| Ti, wt % | 0.022 | 0.015 |
| H, wt % | <0.008 | <0.008 |
| O, wt % | <0.03 | <0.03 |
| N, wt % | <0.01 | <0.01 |
| Tensile, MPa | 525 | 519 |
| Yield Strength, MPa | 434 | 422 |
| ARR | 1.70 | 1.68 |
| PRR | 16.7 | 16.7 |
| Ra (Lateral), micron | ~1.2 | ~1.0 |
| Ra (Longitudinal), micron | 0.31 | 0.36 |
| Roughness Ratio-Ra (Lateral)/LA (Longitudinal) | ~3.8 | ~2.7 |
| Surface Imperfection Ration (SIR) - % | <5 | <5 |
| Surface Removeable Contaminants - ppm by weight | <3,000 | <3,000 |
| Manufacturability Factor, Q, 1/mm | >2,149 | >1,509 |

Whereas particular aspects of this invention have been described above for purposes of illustration, it will be evident to those skilled in the art that numerous variations of the details of the present invention may be made without departing from the invention as defined in the appended claims.

What is claimed is:

1. An aluminum alloy wire for use in an additive processing operation, wherein the aluminum alloy wire comprises:
   aluminum (Al); and
   at least 0.01 wt % scandium (Sc), but not more than 10 wt % scandium,
   wherein the aluminum alloy wire has a lateral surface roughness Ra (lateral), measured in a lateral direction of the aluminum alloy wire, wherein the aluminum alloy wire has a longitudinal surface roughness Ra (longitudinal), measured in a longitudinal direction of the aluminum alloy wire, and wherein the lateral surface roughness Ra (lateral), measured in the lateral direction of the aluminum alloy wire, is greater than the longitudinal surface roughness Ra (longitudinal), measured in the longitudinal direction of the aluminum alloy wire.

2. The aluminum alloy wire of claim 1, wherein the lateral surface roughness Ra (lateral), measured in the lateral direction of the aluminum alloy wire, divided by the longitudinal surface roughness Ra (longitudinal), measured in the longitudinal direction of the aluminum alloy wire, is at least 1.5.

3. The aluminum alloy wire of claim 1, further comprising surface defects limited to a maximum of 10% of an outer surface area of the aluminum alloy wire.

4. The aluminum alloy wire of claim 1, wherein the aluminum alloy wire contains not more than 5 wt % scandium.

5. The aluminum alloy wire of claim 1, further comprising at least 0.01 wt % of an additive selected from the group consisting of zirconium (Zr), rare earth metals, magnesium (Mg), and manganese (Mn), but not more than 4 wt % zirconium, 4 wt % rare earth metals, 20 wt % magnesium, or 3 wt % manganese.

6. The aluminum alloy wire of claim 5, wherein the aluminum alloy wire contains not more than 3 wt % zirconium, 3 wt % rare earth metals, 16 wt % magnesium, or 2 wt % manganese.

7. The aluminum alloy wire of claim 5, wherein the aluminum alloy wire contains not more than 10,000 ppm oxygen (O), 5,000 ppm hydrogen (H), 5,000 ppm nitrogen (N), or 15,000 ppm titanium (Ti).

8. The aluminum alloy wire of claim 1, wherein the aluminum alloy wire has an effective diameter of not more than 6 mm.

9. The aluminum alloy wire of claim 1, wherein the lateral surface roughness Ra (lateral), measured in the lateral direction of the aluminum alloy wire, is at least 0.3 μm.

10. The aluminum alloy wire of claim 9, wherein the lateral surface roughness Ra (lateral), measured in the lateral direction of the aluminum alloy wire, is at least 0.5 μm.

11. The aluminum alloy wire of claim 9, wherein the longitudinal surface roughness Ra (longitudinal), measured in the longitudinal direction of the aluminum alloy wire, is not greater than 2.5 μm.

12. The aluminum alloy wire of claim 11, wherein the longitudinal surface roughness Ra (longitudinal), measured in the longitudinal direction of the aluminum alloy wire, is not greater than 1.5 μm.

* * * * *